(12) United States Patent
Cohen et al.

(10) Patent No.: US 10,848,908 B2
(45) Date of Patent: Nov. 24, 2020

(54) PROXIMITY BASED COMMUNICATION INFORMATION SHARING

(71) Applicant: Avaya Inc., Santa Clara, CA (US)

(72) Inventors: Yuval Cohen, Rishon LeZion (IL); Hiten Joshi, Pune (IN); Sameer Joshi, Pune (IN); Sunil Saraff, Pune (IN); Gal Netanel, Kfar Sava (IL)

(73) Assignee: Avaya Inc., Santa Clara, CA (US)

( * ) Notice: Subject to any disclaimer, the term of this patent is extended or adjusted under 35 U.S.C. 154(b) by 0 days.

(21) Appl. No.: 16/360,560

(22) Filed: Mar. 21, 2019

(65) Prior Publication Data

US 2020/0304941 A1    Sep. 24, 2020

(51) Int. Cl.
*H04W 4/02* (2018.01)
*H04W 76/10* (2018.01)

(52) U.S. Cl.
CPC .......... *H04W 4/023* (2013.01); *H04W 76/10* (2018.02)

(58) Field of Classification Search
CPC .................... H04M 1/7253; H04M 2250/64
See application file for complete search history.

(56) References Cited

U.S. PATENT DOCUMENTS

| | | | |
|---|---|---|---|
| 9,544,411 B2 | 1/2017 | Ozaki | |
| 2004/0132500 A1 | 7/2004 | Rogalski et al. | |
| 2006/0199537 A1* | 9/2006 | Eisenbach | G06F 21/62 455/41.2 |
| 2016/0021487 A1* | 1/2016 | Chen | H04W 76/14 455/41.1 |

* cited by examiner

*Primary Examiner* — Joshua L Schwartz
(74) *Attorney, Agent, or Firm* — Sheridan Ross P.C.

(57) ABSTRACT

A determination is made that a mobile user communication device (e.g., a smartphone) is in spatial proximity to a first user communication device (e.g., a desktop computer). In response to determining that the mobile user communication device is in spatial proximity to the first user communication device, shared communication information is received from the mobile user communication device. For example, the shared communication information may be a list of user contacts. A determination is made that the mobile user communication device is no longer in spatial proximity to the first user communication device. In response to determining that the mobile user communication device is no longer in spatial proximity to the first user communication device, the shared communication information is automatically deleted on the first user communication device.

20 Claims, 4 Drawing Sheets

PROXIMITY BASED COMMUNICATION INFORMATION SHARING

FIELD

The disclosure relates generally to communication devices and particularly to management of communication information for communication devices.

BACKGROUND

Today, a user may have multiple communication devices. For example, the user may have a mobile device, a home desktop computer, and a work desktop computer. One problem that exists is that the user may want to initiate a communication (e.g., a voice call) from a first device to a second user; however the contact information for the second user is stored on second communication device of the user.

SUMMARY

These and other needs are addressed by the various embodiments and configurations of the present disclosure. A determination is made that a mobile user communication device (e.g., a smartphone) is in spatial proximity to a first user communication device (e.g., a desktop computer). In response to determining that the mobile user communication device is in spatial proximity to the first user communication device, shared communication information is received from the mobile user communication device. For example, the shared communication information may be a list of user contacts. A determination is made that the mobile user communication device is no longer in spatial proximity to the first user communication device. In response to determining that the mobile user communication device is no longer in spatial proximity to the first user communication device, the shared communication information is automatically deleted on the first user communication device.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 111(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

DETAILED DESCRIPTION

Figure 1:
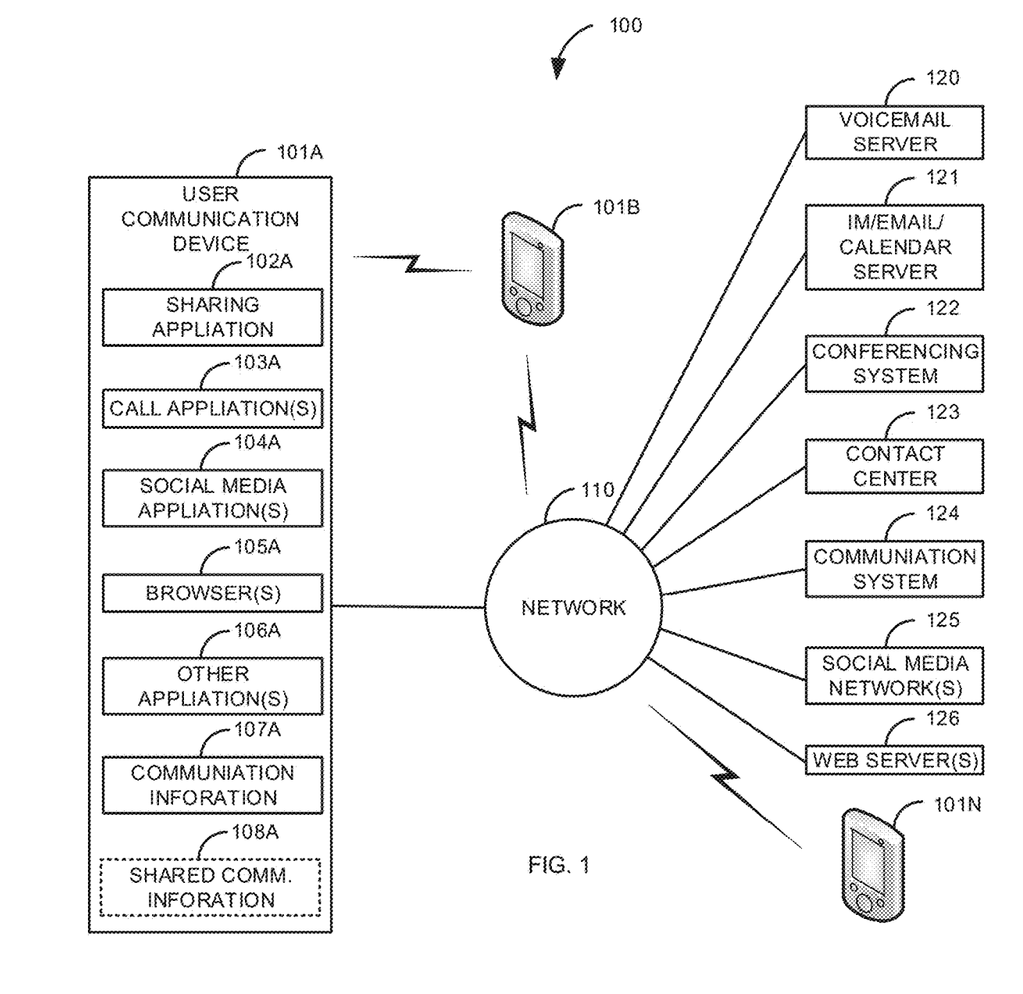
FIG. 1 is a block diagram of a first illustrative system for managing shared communication information.

FIG. 1 is a block diagram of a first illustrative system 100 for managing shared communication information 108. The first illustrative system 100 comprises user communication devices 101A-101N, a network 110, a voicemail server 120, an Instant Messaging (IM)/email/calendaring server 121, a conferencing system 122, a contact center 123, a communication system 124, social media network(s) 125, and web server(s) 126.

The user communication devices 101A-101N can be or may include any user communication device 101 that can communicate on the network 110, such as a Personal Computer (PC), a telephone, a cellular telephone, a Personal Digital Assistant (PDA), a tablet device, a notebook device, a laptop device, a smartphone, a smart watch, a conferencing device, and/or the like. As shown in FIG. 1, any number of user communication devices 101A-101N may be connected to the network 110.

The user communication device 101A further comprises a sharing application 102A, call application(s) 103A, social media application(s) 104A, browser(s) 105A, other application(s) 106A, communication information 107A, and shared communication information 108A. Although not shown for convenience, the user communication device 101A typically comprises other elements, such as, a microprocessor, a display, a speaker, a keyboard, and/or the like.

In FIG. 1, although not shown for convenience, the user communication devices 101B-101N may also comprise some or all of the elements 102A-108A. For example, the user communication device 101B may comprise corresponding elements 102B-108B.

In FIG. 1, the user communication device 101A is a non-mobile user communication device 101A (e.g., a desktop telephone or computer) and the user communication devices 101B-101N are mobile user communication devices 101B-101N. However, in one embodiment, the user communication device 101A may also be a mobile user communication device 101A.

The sharing application 102A can be or may include any application that can manage the sharing of communication information 108A between the user communication devices 101A-101N. The sharing application 102A is responsible for managing how the call application 103A, the social media application 104A, the browser(s) 105A, and the other application(s) 106A use the shared communication information 108A.

The call application(s) 103A can be or may include any application that can initiate voice and/or video calls. For example, the call application(s) 103A may be a telephone application, a Skype™ application, a video conferencing application, and/or the like.

The social media application(s) 104A can be or may include any application that can allow a user to connect to the social media network(s) 125. The social media application(s) 104A may be used to connect to social media network(s) 125, such as Facebook™, YouTube™, LinkedIn™, Twitter™, and/or the like.

The browser(s) 105A can be or may include any known browser, such as, Google Chrome™, Firefox™, Internet Explorer™, Safari™, and/or the like. The browser(s) 105A are used to connect to various web sites, such as, those provided by the web servers 126, the social media network(s) 125, and/or the like.

The other applications 106A can be or may include any application that can use the shared communication information 108A, such as, an email application, a calendaring application, an Instant Messaging (IM) application, a voicemail application, a conferencing application, a contact center application, and/or the like.

The communication information 107A is any type of information that is used by the applications 103A, 104A, 105A, and 106A to establish a communication and/or manage data, such as, a list of contacts (users), a call history, a text messaging history, a voice call history, a video call history, a voicemail address/number of voicemails, a list of social media contacts, a list of IM contacts, an IM history, a list of email contacts, an email history, a browser history, a list of browser favorites, a series of Interactive Voice Response (IVR) responses, a list of IVR responses to access a contact center queue or contact center agent in a contact center 123, a series of dialed access numbers/characters to access the conferencing system 122, a calendar note, a calendar event, picture(s), movie(s), a user profile, a cellular signal strength of a mobile user communication device 101, an idle time of the mobile user communication device 101 (e.g., the mobile user communication device 101B), a wallpaper (e.g., a background picture), and/or the like.

The shared communication information 108A can be or may include any type of communication information 107A that is shared from another user communication device 101. For example, the shared communication information 108A may be some or all of the communication information 107B that has been shared from the user communication device 101B. In this example, the user communication device 101B can share the shared communication information 108A using a protocol that can determine spatial proximity. For example, protocols such as, Bluetooth, Near Field Communication (NFC) protocol, WiFi direct, and/or the like may be used. The shared information 108A may be shared by a corresponding sharing application 102B on the user communication device 101B.

Alternatively, the user communication device 101B may not have a corresponding sharing application 102. In this embodiment, the communication information 107B may be shared using Bluetooth profiles (e.g., as described in https://en.wikipedia.org/wiki/List of Bluetooth profiles, which is incorporated herein by reference). The sharing application 102A takes the information in the shared Bluetooth profiles (the shared communication information 108A) to be used by the applications 103A-106A.

In FIG. 1, the shared communication information 108A is shown with a dotted line. This indicates that the shared communication information 108A is only stored temporarily on the user communication device 101A.

The network 110 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 110 can use a variety of electronic protocols, such as Ethernet, Internet Protocol (IP), Session Initiation Protocol (SIP), Integrated Services Digital Network (ISDN), video protocols, email protocols, IM protocols, and/or the like. Thus, the network 110 is an electronic communication network configured to carry messages via packets and/or circuit switched communications.

The voicemail server 120 can be or may include any hardware coupled with software that can record and store voicemails/videomails. The voicemail system 120 may be accessed by using an address in various ways, such as, based on a telephone number (a type of address), a URL (a type of address), an IP address, a network address, and/or the like.

The IM/email/calendaring server 121 can be or may include any server that can provide IM, email, and/or calendaring services for the user communication devices 101A-101N. The IM/email/calendaring server 121 may support any known IM/email/calendaring protocols.

The conferencing system 122 can be or may include any hardware coupled with software that can provide conferencing services for the user communication devices 101A-101N. For example, the conferencing system 122 may allow a user to access a specific voice, video, and/or IM conference using a telephone number and access code, a URL/access code, and/or the like (i.e., a series of entered/dialed numbers/letters/characters).

The contact center 123 can be or may include any system where a user of the user communication devices 101A-101N may communicate with a contact center agent. The user may reach a contact center agent in various ways, such as, using a series of Interactive Voice Response (IVR) system responses (e.g., to access a contact center queue or contact center agent). The user may access the contact center 123 using different types of media, such as, voice, video, email, text messaging, IM, virtual reality, and/or the like. These various types of addresses/information can be part of the shared communication information 108A.

The communication system 124 can be or may include any hardware coupled with software that can provide communication management, such as, a Private Branch Exchange (PBX), a session manager, a communication manager, a router, a switch, a proxy server, and/or the like. The communication system 124 may be used by the user communication devices 101A-101N for establishing voice communications, video communications, IM communications, text messaging communications, virtual reality communications, gaming communications, and/or the like.

The social media network(s) 125 can be or may include any known social media network 125. The social media network(s) 125 allow users of the user communication devices 101A-101N to communicate with each other.

The web server(s) 126 can be or may include any known web server 126. The web server(s) 126 can be accessed by the browser(s) 105A by using entered addresses, a browser history, and/or browser favorites.

The devices 120-126 as described herein are considered a type of communication device. The devices 120-126 can be accessed from any of the user communication devices 101A-101N.

Figure 2:
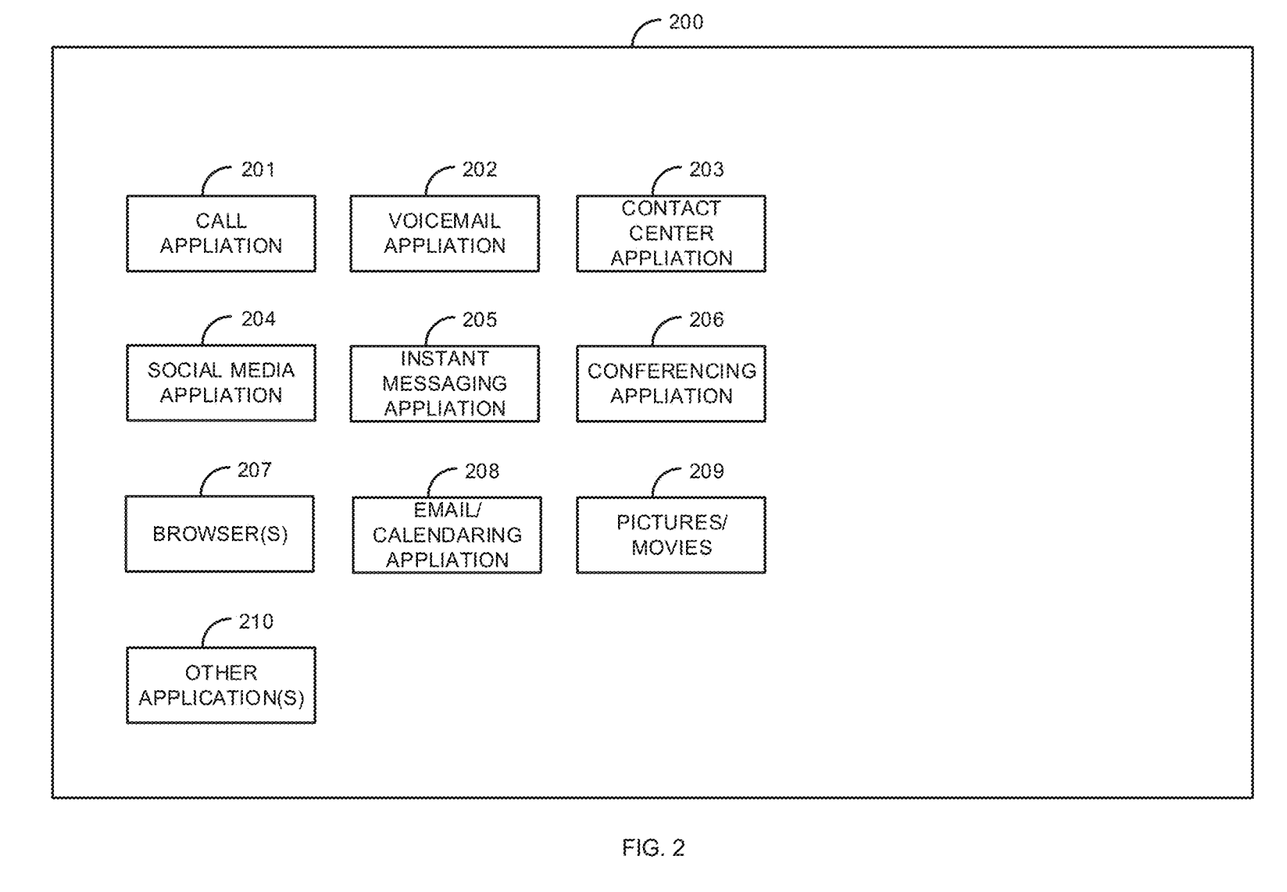
FIG. 2 is a diagram of a user interface for accessing shared communication information with different applications.
Figure 3:
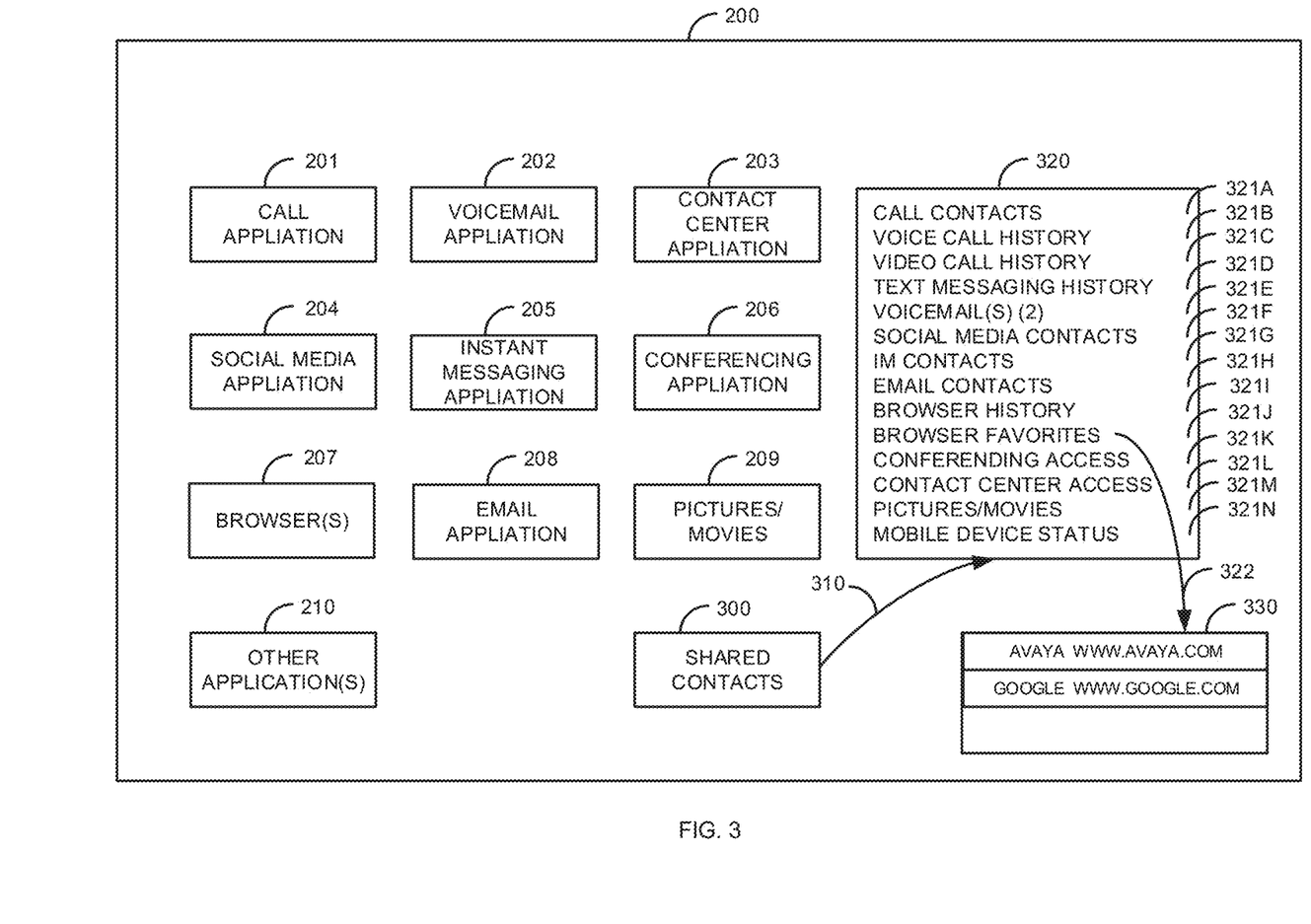
FIG. 3 is a diagram of a user interface of accessing shared communication information using a separate application.
Figure 4:
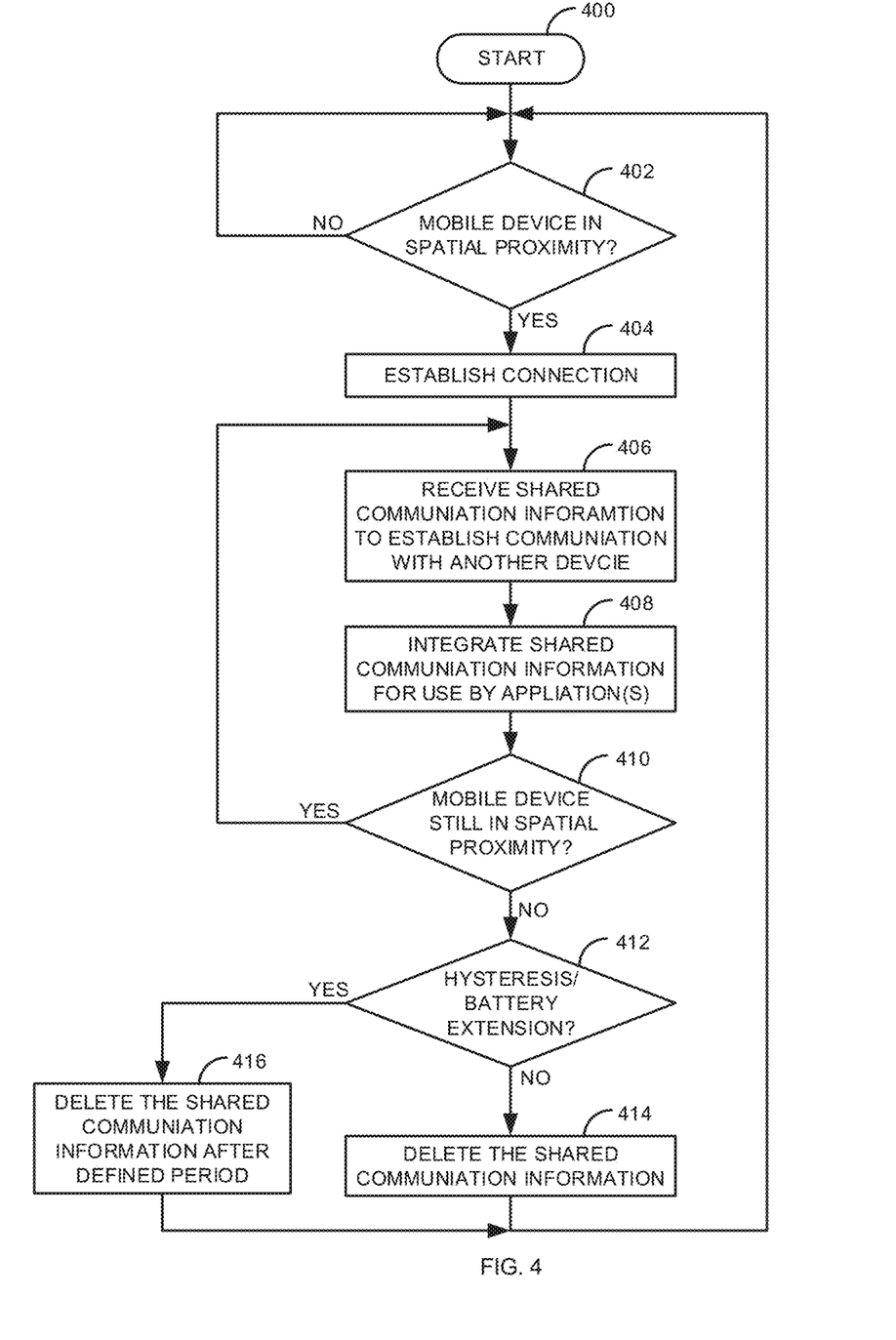
FIG. 4 is a flow diagram of a process for managing shared communication information.

FIG. 2 is a diagram of a user interface 200 for accessing shared communication information 108A with different applications 103A-106A. Illustratively, the user communication devices 101A-101N, the sharing application 102A, the call application(s) 103A, the social media application(s) 104A, the browser(s) 105A, the other application(s) 106A, the voicemail server 120, the IM/email/calendar server 121, the conferencing system 122, the contact center 123, the communication system 124, the social media network(s) 125, and the web server(s) 126 are stored-program-controlled entities, such as a computer or microprocessor, which performs the method of FIGS. 2-4 and the processes described herein by executing program instructions stored in a computer readable storage medium, such as a memory (i.e., a computer memory, a hard disk, and/or the like). Although the methods described in FIGS. 2-4 are shown in a specific order, one of skill in the art would recognize that the steps in FIGS. 2-4 may be implemented in different orders and/or be implemented in a multi-threaded environment. Moreover, various steps may be omitted or added based on implementation.

The user interface 200 is displayed in the user communication device 101A. The user interface 200 comprises comprise an call application icon 201, a voicemail application icon 202, a contact center application icon 203, a social media application icon 204, an Instant Messaging application icon 205, a conferencing application icon 206, a browser(s) icon 207, an email/calendaring application icon 208, a pictures/movies icon 209, and other application(s) icon 210.

In FIG. 2, when the shared communication information 108A is received (e.g., from the user communication device 101B), the sharing application 102A makes the shared communication information 108A available so that the applications associated with the icons 201-210 can use the shared communication information 108A.

The call application icon 201 is used to execute the call application(s) 103A. When the call application(s) 103A are executed or are running, the shared communication information 108A that is associated with call application(s) 103A is integrated into the call application(s) 103A. For example, the shared communication information 108A that is associated with the call application(s) 103A may include: a list of contacts, a call history, a text messaging history, a voice call history, a video call history, and/or the like. Using the shared communication information 108A, the user of the user communication device 101A may then access the communication system 124 to initiate a communication. For example, by clicking on the call application icon 201 and executing the call application(s) 103A, the user of the communication device 101A may initiate a voice or video communication, via the communication system 124, to the user communication device 101N using the shared communication information 108A.

The voicemail application icon 202 is used to execute a voicemail application (another application 106A). When the voicemail application is executed or running, the shared communication information 108A that is associated with the voicemail application is integrated. The shared communication information may include an address of the voicemail server 120, a number of current voicemails/videomails, and/or the like. Using the shared communication information 108A, the user of the user communication device 101A may then access the voicemail server 120 to retrieve the one or more voicemails/videomails. In one embodiment, the voicemail application may show two voicemail servers 120 (one for the user communication device 101A and one for the user communication device 101B) and their respective voice/videomails.

The contact center icon 203 is used to execute a contact center application (another application 106A). When the contact center application is executed or running, the shared communication information 108A that is associated with the contact center application is integrated into the contact center application. For example, the shared communication information 108A that is associated with the contact center application may include: a series of interactive voice response system responses (e.g., to access a contact center queue or specific contact center agent), a telephone number of the contact center 123, an email address of the contact center 123, a IM address of the contact center 123, an IP address of the contact center 123, a social media address of the contact center 123 (may be one of the social media network(s) 125), and/or the like. Using the shared communication information 108A, the user of the user communication device 101A may then initiate a communication to the contact center 123. For example, by clicking on the contact center application icon 203 and executing the contact center application, the user of the communication device 101A may initiate a voice or video communication directly to a contact center queue.

The social media application icon 204 is used to execute the social media application(s) 104A. When the social media application(s) 104A are executed or running, the shared communication information 108A that is associated with the social media network(s) 125 in integrated into the social media application(s) 104A. For example, the shared communication information 108A that is associated with social media application(s) 104A may include: an address of the social media network(s) 125, a list of social media contacts, a password to the social media network(s) 125, and/or the like. Using the shared communication information 108A, the user of the user communication device 101A may then access the social media network(s) 125. For example, by clicking on the social media application icon 204 and executing the social media application 104A, the user of the user communication device 101A may establish a communication session to the social media network(s) 125.

The instant messaging application icon 205 is used to execute an Instant Messaging (IM) application (another application 106A). When the IM application is executed or running, the shared information that is associated with the IM application is integrated into the IM application. For example, the shared communication information 108A that is associated with the IM application may include: an address of the IM/email/calendaring server 121, a list of IM contacts, a history of IM contacts, and/or the like. Using the shared communication information 108A, the user of the user communication device 101A may then access the IM/email/calendaring server 121 to establish an IM session with another user. For example, by clicking on the instant messaging application icon 205 and executing the IM application, the user can initiate an IM session with a user of the user communication device 101N.

The conferencing application icon 206 is used to execute a conferencing application (another application 106A). When the conferencing application is executed or running, the shared communication information 108A that is associated with the conferencing application is integrated into conferencing application. For example, the shared communication information 108A that is associated with the conferencing application may include: and address of the conferencing system 122, a telephone number of the conferencing system 122, an access code/number (using numbers/characters), a host code (using numbers/characters), and/or the like. Using the shared communication information 108A, the user of the user communication device 101A may then access the conferencing system 122. For example, by clicking on the conferencing application icon 206 and executing the conferencing application, the user of the user communication device 101A may initiate a voice, a video, and/or an IM communication to the conferencing system 122.

The browser(s) icon 207 is used to execute the browser(s) 105A. When the browser(s) 105A are executed or running, the shared communication information 108A that is associated with the browser(s) 105A is integrated into the browser(s) 105A. For example, the shared communication information 108A that is associated with the browser(s) 105A may include: a browser history, a list of browser favorites, browser security profiles (browser security settings, such as, allow cookies, etc.), and/or the like. The user of the user communication device 101 may then access the web server(s) 126 using the shared browser history/shared browser favorites.

In one embodiment, the shared communication information 108A may have different browser histories/lists of browser favorites for multiple different browsers 105. For example, the shared communication information 108A may comprise a browser history/list of browser favorites for both an Internet Explorer™ browser 105 and a Chrome™ browser.

In one embodiment, the sharing application 102A may convert the browser history/list of browser favorites for a first type of browser 105 to a different type of browser 105. For example, if the shared communication information 108A has a browser history/browser favorites for a Chrome™ browser 105 and the user communication device 101A only has an Internet Explorer™ browser 105 (or the Internet Explorer™ browser 105 is the preferred browser 105), the sharing application 102A may change the formats so that the Internet Explorer™ browser 105A on the user communication device 101A can show the shared browser history/browser favorites that came from the Chrome™ browser 105 on the user communication device 101B.

The email/calendaring application icon 208 is used to execute an email/calendaring application (another application 106A, such as Microsoft's Outlook™). When the email/calendaring application is executed or running, the shared communication information 108A that is associated with the email/calendaring application is integrated into the email/calendaring application. For example, the shared communication information 108A that is associated with the email/calendaring application may include an address of the IM/email/calendaring server 121, a list of email contacts, an email history, calendaring events, calendar notes, calendar tasks, and/or the like. The user of the user communication device 101A may then access the IM/email/calendaring server 121. For example, by clicking on the email/calendaring application icon 208, the user of the user communication device 101A may send an email to the user communication device 101N using the shared list of email contacts or view calendar events that are part of the shared communication information 108A The pictures/movies icon 209 is used to execute a picture/movie application (another application 106A). When the pictures/movies application is executed, the shared communication information 108A that is associated with the pictures/movies application is integrated into the pictures/movies application. For example, the shared communication information 108A that is associated with the pictures/movies application may include: pictures, movies, and/or the like. Using the shared communication information 108A, the user of the user communication device 101A may then access the shared pictures/movies.

The other application(s) icon 210 is used to execute any other applications 106A that may access the shared communication information 108A. For example, a user profile that includes a wallpaper (e.g., a picture that is displayed in the background of the user interface 200) may be used by an application or the sharing application 102A. Other applications 106A may use different shared communication information 108A, such as, a network strength a cellular network (e.g., that of mobile device 101B) to indicate that the cellular network may be down. The network strength may be sent over time (e.g., periodically) and displayed to the user on the user communication device 101A. An idle time of a mobile communication device may be used by an application. The idle time may also be sent periodically and displayed on the user communication device 101A.

In FIG. 3, the shared communication information 108A may be integrated with the applications in various ways. For example, a common contact resource may be used. When the shared communication information 108A is integrated, the added elements are flagged (e.g., timestamped) so that they can be later removed when the mobile user communication device 101B is no longer in proximity. A merged list of shared communication information may use a special icon that differentiates the shared communication information 108A from the communication information 107A.

FIG. 3 is a diagram of a user interface 200 of accessing shared communication information 108A using a separate application. The user interface 200 comprises the icons 201-210. In FIG. 3, the shared communication information 108A is managed separately.

When the shared communication information 108A is received by the user communication device 101A, a shared contacts icon 300 is temporarily displayed (until the user communication device 101B is no longer in spatial proximity) to the user of the user communication device 101A. The shared contacts icon 300 is used to display/manage the shared communication information 108A.

When the user clicks on the shared contacts icon 300, as shown in step 310, a shared communication window 320 is displayed to the user of the user communication device 101A. The shared communication window 320 contains a list of communication options 321A-321N. The list of communication options 321A-321N comprises a call contacts option 321A, a voice call history option 321B, a video call history option 321C, a text messaging history option 321D, a voicemail(s) option 321E, a social media contacts option 321F, an IM contacts option 321G, an email contacts option 321H, a browser history option 321I, a browser favorites option 321I, a conferencing access option 321K, a contact center access option 321L, a pictures/movies option 321M, and a mobile device status option 321N.

The call contacts option 321A, when selected by the user, displays a list of contacts for establishing a communication. The user can then select one of the contacts to make a particular type of communication (e.g., a voice call).

The voice call history option 321B, when selected by the user, displays a recent history of a voice calls. The user may then select one of the voice call history items to make the voice call to the selected user.

The video call history option 321C, when selected by the user, displays a recent history of video calls. The user may then select one of the video call history items to make a video call to the selected user.

The text messaging history option 321D, when selected by the user, displays a recent history of text messages. The user may then select one of the text messaging history items to send a text message to the selected user.

The voicemail(s) option 321E, when selected by the user, displays a list of voice mails (two in this example). The user can the select one of the voicemail items to listen to a voicemail (may also be a videomail).

The social media contacts option 321F, when selected by the user, displays a list of social media contacts to the user. The user may then select one of the social media contacts to send a message via a social media network 125 to the selected social media contact.

The IM contacts option 321G, when selected by the user, displays a list of IM contacts to the user. The user may then select one of the IM contacts to establish an IM session with the selected contact.

The email contacts option 321H, when selected by the user, displays a list of email contacts to the user. The user may then select one of the email contacts to send an email to the selected user.

The browser history option 321I, when selected by the user, displays a browser history to the user. The user can then selection one of the browser history items to go the selected web page.

The browser favorites option 321I, when selected by the user (e.g., as shown in step 322), displays a list of browser favorites in the browser favorites window 330. The user can the select one of the browser favorites (e.g., Avaya) to go to the web site (www.avaya.com) associated with the browser favorite.

The conferencing access option 321K, when selected by the user, displays a list of access options to the user. For example, the displayed list of access options may display a telephone number/access code, which can be selected by the user to directly dial into a specific conference (e.g., a voice call).

The contact center access option 321L, when selected by the user, displays a list of access options within the contact center 123. For example, the list of access options may include voice call option, a video call option, an email option, an IM option, an option to respond to a series of interactive voice response system prompts to automatically connect to a contact center queue or contact center agent.

The pictures/movies option 321M, when selected by the user, displays a list of pictures/movies. The user may then select one of the pictures/movies to view the picture/movie.

The mobile device status option 321N, when selected by the user, displays different statuses of the mobile user communication device 101B. For example, a cellular connection status may be displayed, a battery status may be displayed, and/or the like.

In addition, the shared communication window 320 may display other types of shared information. For example, shared communication window 320 may display a status of any new text messages, welcome messages, documents, an application status, and/or the like.

FIG. 4 is a flow diagram of a process for managing shared communication information 108A. The process of FIG. 4 is where the mobile user communication device 101B is sharing its shared communication information 108A with the user communication device 101A.

The process starts in step 400. The sharing application 102A determines, in step 402, if the mobile user communication device 101B is in spatial proximity to the user communication device 101A. For example, if a Bluetooth, RFC, WiFi direct connection can be established. If the mobile device 101B is not in spatial proximity in step 402, the process of step 402 repeats.

Otherwise, if the mobile user communication device 101B is in spatial proximity to the user communication device 101A in step 402, a connection is established between the mobile user communication device 101B and the user communication device 101A in step 404. The sharing application 102A receives, in step 406, the shared communication information 108A from the mobile user communication device 101B. The sharing application 102A temporarily integrates (until the mobile user communication device 101B is no longer in spatial proximity), in step 408, the shared communication information 108A for use by the application(s). For example, the sharing application 102A may integrate a list of contacts for the call application(s) 103A.

The sharing application 102A determines, in step 410, if the mobile user communication device 101B is still in spatial proximity. If the mobile user communication device 101 B is still in proximity, the process goes back to step 406. By going back to step 406, the shared communication information 108A may be updated if necessary. For example, if the user receives an email after first receiving the shared communication information in step 406, the email history may be updated in step 406.

If the mobile user communication device 101B is no longer in spatial proximity in step 410 (e.g., the connection is lost), the sharing application 102A determines, in step 412, if hysteresis/battery status are also used to extend a time when to delete the shared communication information 108A. For example, the user may define a short period of time (e.g., 10 minutes) after the mobile user device 101B is no longer in proximity before the shared communication information 108A is deleted. The user may also choose to extend this hysteresis threshold for deletion of the shared communication information 108A when the sharing application 102A detects that the battery of the mobile user communication device 101B is below a certain threshold; this allows the user to access the shared communication information 108B from the user communication device 101A even after the mobile user communication device's battery runs out. If hysteresis/battery life are not enabled in step 412, the sharing application 102A deletes, in step 414, the shared communication information 108A. The process then goes back to step 402.

If hysteresis and/or battery life are used to extend the deletion time in step 412, the shared communication information 108A is deleted, in step 416, at a determined time period after the mobile user communication device 101B is no longer in proximity to the user communication device 101A based on the hysteresis threshold. The process then goes back to step 402.

When the shared communication information 108A is deleted in steps 414/416, the applications can no longer use/display the shared communication information 108A. This protects the privacy of the user.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A first user communication device, comprising:
   a microprocessor; and
   a computer readable medium, coupled with the microprocessor and comprising microprocessor readable and executable instructions that, when executed by the microprocessor, cause the microprocessor to:
      determine that a mobile user communication device is in spatial proximity to the first user communication device;
      in response to determining that the mobile user communication device is in spatial proximity to the first user communication device, receive shared communication information from the mobile user communication device;
      determine that the mobile user communication device is no longer in spatial proximity to the first user communication device; and
      in response to determining that the mobile user communication device is no longer in spatial proximity to the first user communication device, automatically delete the shared communication information on the first user communication device,
   wherein determining that the mobile user communication device is no longer in spatial proximity to the first user communication device further comprises at least one of using an extended time period and a battery level of the mobile user communication device.

2. The first user communication device of claim 1, wherein the shared communication information allows the first user communication device to establish a communication with a second communication device, wherein the shared communication information comprises at least one of: a list of contacts, a call history, a text messaging history, a voice call history, a video call history, an email history, an Instant Messaging (IM) history, a list of IM contacts, a list of social medial contacts, a list of email contacts, a calendar note, a calendar task, and a calendar event.

3. The first user communication device of claim 1, wherein the shared communication information comprises a voicemail/videomail address and a number of current voicemails/videomails for connecting to a voice/videomail system.

4. The first user communication device of claim 1, wherein the shared communication information comprises at least one of a browser history, a list of browser favorites, and a browser security profile for connecting to a web server.

5. The first user communication device of claim 4, wherein the at least one of the browser history and the list of browser favorites comprises a plurality of browser histories on a plurality of different browsers and a plurality of browser favorites on the plurality of different browsers.

6. The first user communication device of claim 1, wherein the shared communication information comprises at least one of: a series of interactive voice response system responses to establish a communication with a contact center and a series of entered/dialed numbers and/or characters to access a conferencing system.

7. The first user communication device of claim 1, wherein the shared communication information further comprises at least one of: a picture, a movie, a user profile, a wallpaper, a cellular network signal strength of the mobile user communication device, and an idle time of the mobile user communication device.

8. The first user communication device of claim 1, wherein the shared communication information is temporarily merged with existing communication information until the mobile user communication device is no longer in spatial proximity to the first user communication device and wherein the shared communication information is displayed with a different icon so that the shared communication information can be differentiated by a user of the first user communication device.

9. The first user communication device of claim 1, wherein the shared communication information is displayed separately from existing communication information on the first user communication device.

10. The first user communication device of claim 1, wherein the shared communication information comprises a plurality of separate communication types and wherein the plurality of separate communication types are accessed for display in a plurality of separate applications on the first user communication device.

11. A method, comprising:
    determining that a mobile user communication device is in spatial proximity to a first user communication device;
    in response to determining that the mobile user communication device is in spatial proximity to the first user communication device, receiving shared communication information from the mobile user communication device, wherein the shared communication information allows the first user communication device to establish a communication with a second communication device;
    determining that the mobile user communication device is no longer in spatial proximity to the first user communication device; and
    in response to determining that the mobile user communication device is no longer in spatial proximity to the first user communication device, automatically deleting the shared communication information on the first user communication device,
    wherein determining that the mobile user communication device is no longer in spatial proximity to the first user communication device further comprises at least one of: using an extended time period and a battery level of the mobile user communication device.

12. The method of claim 11, wherein the shared communication information allows the first user communication device to establish a communication with a second communication device, wherein the shared communication information comprises at least one of: a list of contacts, a call history, a text messaging history, a voice call history, a video call history, an email history, an Instant Messaging (IM) history, a list of IM contacts, a list of social medial contacts, a list of email contacts, a calendar note, a calendar task, and a calendar event.

13. The method of claim 11, wherein the shared communication information comprises a voicemail/videomail address and a number of current voicemails/videomails for connecting to a voice/videomail system.

14. The method of claim 11, wherein the shared communication information comprises at least one of a browser history, a list of browser favorites, and a browser security profile for connecting to a web server.

15. The method of claim 11, wherein the shared communication information comprises at least one of: a series of interactive voice response system responses to establish the communication with a contact center and a series of entered/dialed numbers and/or characters to access a conferencing system.

16. The method of claim 11, wherein the shared communication information further comprises at least one of: a picture, a movie, a user profile, a wallpaper, a cellular network signal strength of the mobile user communication device, and an idle time of the mobile user communication device.

17. The method of claim 11, wherein the shared communication information is temporarily merged with existing communication information until the mobile user communication device is no longer in spatial proximity to the first user communication device and wherein the shared communication information is displayed with a different icon so that the shared communication information can be differentiated by a user of the first user communication device.

18. A mobile user communication device, comprising:
    a microprocessor; and
    a computer readable medium, coupled with the microprocessor and comprising microprocessor readable and executable instructions that, when executed by the microprocessor, cause the microprocessor to:
        determine that a first user communication device is in spatial proximity to the mobile user communication device; and
        in response to determining that the first user communication device is in spatial proximity to the mobile user communication device, sending shared communication information to the first user communication device,
    wherein the first user communication device automatically deletes the shared communication information based on the first user communication device no longer being in spatial proximity to the mobile user communication device, and
    wherein when the mobile user communication device is no longer in spatial proximity to the first user communication device further comprises at least one of: using an extended time period and a battery level of the mobile user communication device.

19. The device of claim 18, wherein the shared communication information when executed, allows the first user communication device to establish a two-way communication with a second communication device.

20. The device of claim 18, wherein the shared communication information is temporarily merged with existing communication information until the mobile user communication device is no longer in spatial proximity to the first user communication device and wherein the shared communication information is displayed with a different icon so that the shared communication information can be differentiated by a user of the first user communication device.

* * * * *